(12) United States Patent
Gall et al.

(10) Patent No.: US 7,668,676 B2
(45) Date of Patent: Feb. 23, 2010

(54) METHOD FOR CALIBRATION, CONTROLLED BY MEANS OF MEASUREMENT TECHNOLOGY, OF AT LEAST ONE DEVICE UNIT OF A DEVICE SYSTEM, PARTICULARLY A STANDARD LIGHT DEVICE IN COLOR MANAGEMENT WORKFLOW

(75) Inventors: Michael Gall, Salach (DE); Karl Koch, Penzberg (DE)

(73) Assignee: Just Normlicht GmbH Vertrieb + Produktion, Weilheim/Teck (DE)

( * ) Notice: Subject to any disclaimer, the term of this patent is extended or adjusted under 35 U.S.C. 154(b) by 17 days.

(21) Appl. No.: 11/903,981

(22) Filed: Sep. 25, 2007

(65) Prior Publication Data

US 2008/0077344 A1    Mar. 27, 2008

Related U.S. Application Data

(60) Provisional application No. 60/851,811, filed on Oct. 13, 2006.

(30) Foreign Application Priority Data

Sep. 25, 2006    (DE) .................... 10 2006 045 612

(51) Int. Cl.
*G01D 18/00*    (2006.01)

(52) U.S. Cl. .................. 702/85; 345/690; 378/207; 705/27

(58) Field of Classification Search .............. 702/81, 702/84, 85; 345/600, 690; 705/27; 378/207
See application file for complete search history.

(56) References Cited

U.S. PATENT DOCUMENTS

| | | | |
|---|---|---|---|
| 7,034,852 B2* | 4/2006 | Matsuda et al. | 345/690 |
| 7,487,118 B2* | 2/2009 | Crutchfield et al. | 705/27 |
| 2004/0246274 A1* | 12/2004 | Rykowski et al. | 345/690 |
| 2005/0100136 A1* | 5/2005 | Kawatsu | 378/207 |

* cited by examiner

*Primary Examiner*—John H Le
(74) *Attorney, Agent, or Firm*—Collard & Roe, P.C.

(57) ABSTRACT

A method for calibration is controlled using measurement technology of at least one device unit of a device system which includes a monitor for image processing and a standard light device. The monitor is calibrated, and the luminance is measured at the calibrated monitor and at a standard light device. The actual value of the luminance at the standard light device is compared with the value for the luminance of the monitor. If there is a difference, the standard light device receives a control signal to change the brightness or the contrast. This regulation is continued until no difference exists between the measured actual value at the standard light device and the reference value stored in the memory of the evaluation unit.

3 Claims, 3 Drawing Sheets

METHOD FOR CALIBRATION, CONTROLLED BY MEANS OF MEASUREMENT TECHNOLOGY, OF AT LEAST ONE DEVICE UNIT OF A DEVICE SYSTEM, PARTICULARLY A STANDARD LIGHT DEVICE IN COLOR MANAGEMENT WORKFLOW

CROSS REFERENCE TO RELATED APPLICATIONS

Applicants claim priority under 35 U.S.C. 119 of German Application Serial No. 10 2006 045 612.2 filed Sep. 25, 2006. Applicants also claim priority under 35 U.S.C. 119(e)(1) and the benefit of co-pending U.S. Provisional Application Ser. No. 60/851,811 filed Oct. 13, 2006 which is incorporated by reference herein.

BACKGROUND OF THE INVENTION

1. Field of the Invention

The invention relates to a method for calibration, controlled by means of measurement technology, of at least one device unit of a device system, particularly a standard light device in color management workflow. Such methods are primarily used in device systems used in the graphics and photography industry.

2. The Prior Art

It is currently a common method in the graphics industry to calibrate or profile high-quality image processing monitors with measurement technology support. In order to be able to provide samples of color proof prints (proofs) with the image on the calibrated monitor, with binding colors, a standard light device is required according to ISO 3664:2000/ISO 12646 for a said device system, which offers standardized light conditions and corresponds to the illumination intensity of the luminance on the monitor. However, the luminance on the monitor varies from one monitor model to another, and can lie between 80 and 240 $cd/m^2$.

Accordingly, it is necessary to be able to adjust the standard light device in terms of its illumination intensity. Therefore, visual inspections and changes by means of slide regulators are performed on the standard light device, in other words it is adjusted by hand, and this is time-consuming and, in particular, inaccurate.

SUMMARY OF THE INVENTION

It is therefore the task of the invention to develop a method with which the aforementioned adjustment/calibration takes place more precisely and with less expenditure of time.

In the case of a said device system, which consists at least of an image processing monitor and a standard light device, according to the new method, first the monitor is calibrated using a color measurement device and an evaluation program. In this way, the target brightness—reference value—of the standard light device is established at the same time. Using the same color measurement device, the brightness of the standard light device is then measured. The signal obtained is then passed to an evaluation unit, by way of a signal line, in which unit the signal relating to the target brightness measured at the monitor is also stored.

The standard light device receives one or several signals with which the brightness and/or the contrast are changed at the standard light device, as a function of the difference between the brightness measured at the standard light device and the reference value, the target brightness.

On the basis of the change at the standard light device that has been carried out, the evaluation unit again receives a corresponding signal, and compares the latter with the reference value, the target brightness measured at the monitor.

If there is still a difference between the two measured values, another adjustment of the standard light device occurs, as explained above. This adjustment routine at the standard light device is carried out until the optimal setting of the latter has been achieved.

This adjustment takes place automatically, the user simply positions the color measurement device on the monitor first, and subsequently positions it at the standard light device. The result of this method is the identical appearance of the soft proof on the monitor for image processing and the proof in the standard light device.

Using this method, a solution has been created for light intensity calibration of a standard light device, using an evaluation program for monitor calibration.

The invention furthermore comprises new, supplemented methods for calibration of a monitor. According to one method, it is provided that not only the values for color and for the maximal brightness of the white point of the monitor and the selection of fixed gradation curves, independent of the ambient brightness, but also the color sensitivity change of the observer are taken into consideration.

The user additionally indicates the reference brightness, for which the system is supposed to be optimized, among the parameters for monitor calibration. The input optionally occurs by means of manual indication of the reference brightness, selection from a number of defaults, empirical visual determination by way of test patterns, or by means of measurement of the reference light, using a suitable measurement device. This is then taken into consideration both in the gradation of the calibration (video LUT on the graphics card or hardware LUT in the monitor) and in the calculation of the monitor profile. Color perception models (e.g. CIECAM02) are the basis for the calculation. Both methods—adaptation of the calibration and adaptation of the monitor profile—can be used, separately from one another, and can be optionally selected by the user. The calibration produces a basic setting of the reproduction system that is optimally adapted to the reference brightness; the system profile assures a color representation in color management workflow that is adapted to the reference brightness.

In the case of another method for calibrating the monitor, it is provided that the surface reflection of the reproduction system is taken into consideration.

Here, the reflection of the ambient light on the surface of the reproduction system is taken into consideration in the calibration and profiling of the monitor. Detection of the reflection behavior can optionally take place in different ways:

Two measurement series of color fields:
First, measurement takes place in direct contact of the measurement device with the surface; in the second measurement series, there is a distance between measurement device and surface, so that the ambient light can impact the measured surface. The influence of the ambient light is calculated from the two measurement series.

Measurement of the surface reflection with a reflected light measurement device:
If the reflection behavior of the surface and the reference light are known, all of the parameters can be calculated from this.

Manual input by the user:
The user can select among reflection data for several device types stored in the software, or input new reflection data.

Empirical determination by means of test pattern:
The software displays test patterns, the user can change the system setting manually and establish the work point visually.

The required data concerning the reference light result automatically (in the case of two measurement series or visual evaluation of test patterns) or are optionally input manually, selected from a number of defaults, or obtained by means of measuring the reference light.

Using the two supplemented methods, the following are taken into consideration:
 a) The change in color perception of the observer by means of the adaptation of the eye to the ambient light and/or to the comparison system (e.g. standard light device next to the monitor).
 b) The change in the display by means of the reflection of the ambient light on the monitor surface.

Measurement data, calibration tables, and the monitor profile are adapted with these additional data with regard to surface reflection and reference brightness for the evaluation program. In the end result, what is achieved is that a data set produces the same color perception of the observer even if one monitor is operated in a bright environment, while a second monitor is operated in a dark environment.

The two supplemented methods—taking the change in color perception into consideration and correcting the surface reflection—can be used independent of one another. Intervention in measurement data, calibration table, and monitor profiles are also technologies that can be utilized independent of one another.

BRIEF DESCRIPTION OF THE DRAWINGS

The invention will be explained in greater detail using the example of a device system shown schematically in the drawing, for use in color management workflow of the graphics industry. In this connection, the figures show.

DETAILED DESCRIPTION OF PREFERRED EMBODIMENTS

Figure 1:
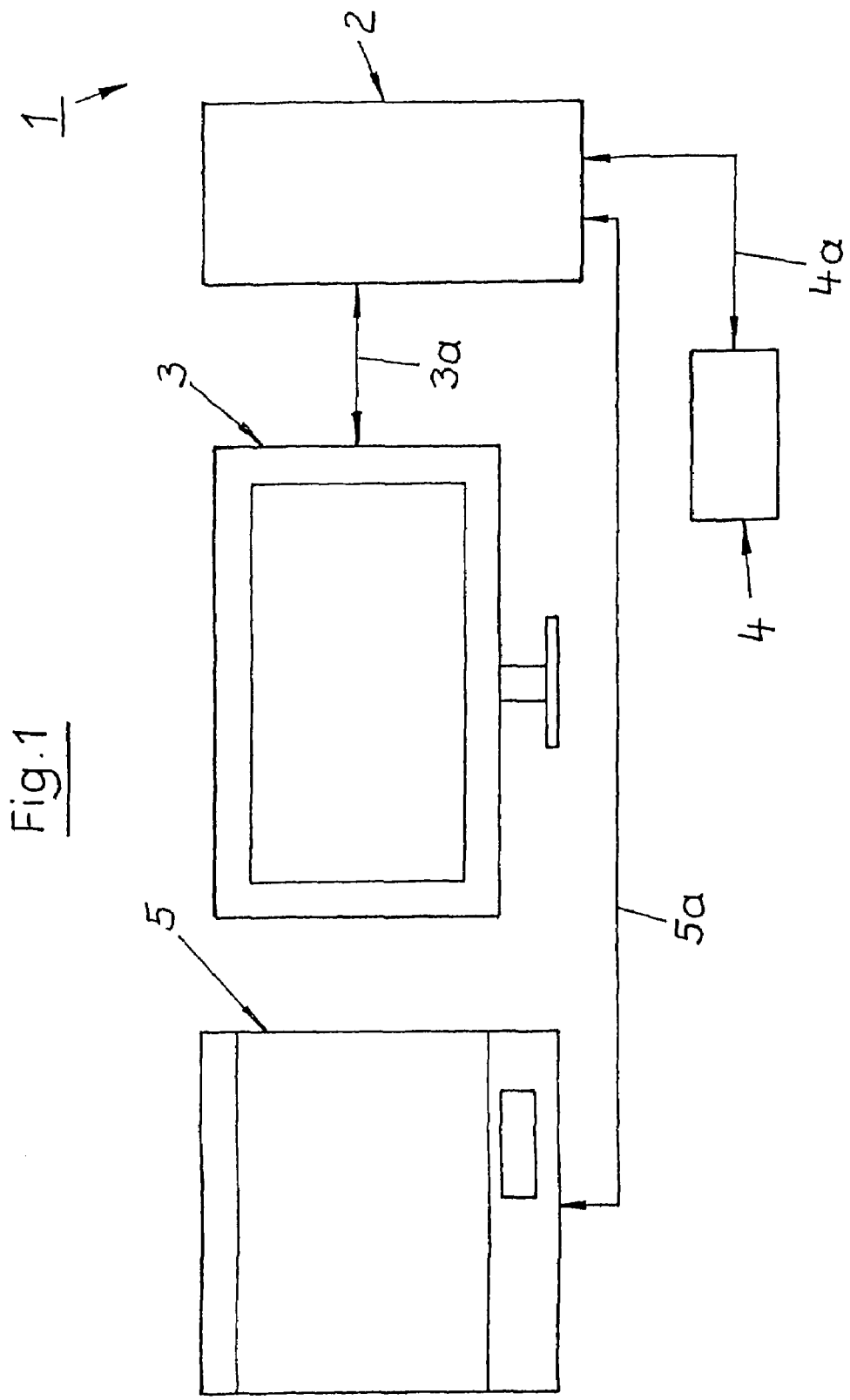
FIG. 1 a device system for implementing the new method.

FIG. 1 shows a device system 1, in a schematic representation, in which the new method is used. This device system 1 is, for example, a workstation in the graphics industry. The device system 1 comprises at least a monitor 3 and a standard light device 5. To carry out the new method, it is furthermore provided, in a new embodiment, that this device system 1 also has an evaluation unit 2, for example a personal computer, assigned to it. The monitor 3 is connected with the evaluation unit 2 by way of a signal line 3a. Likewise, the standard light device 5 is connected with the evaluation unit 2 by way of another signal line 5a. A color and light measurement device 4 is also connected with the evaluation unit 2, by way of another signal line 4a.

Figure 2:
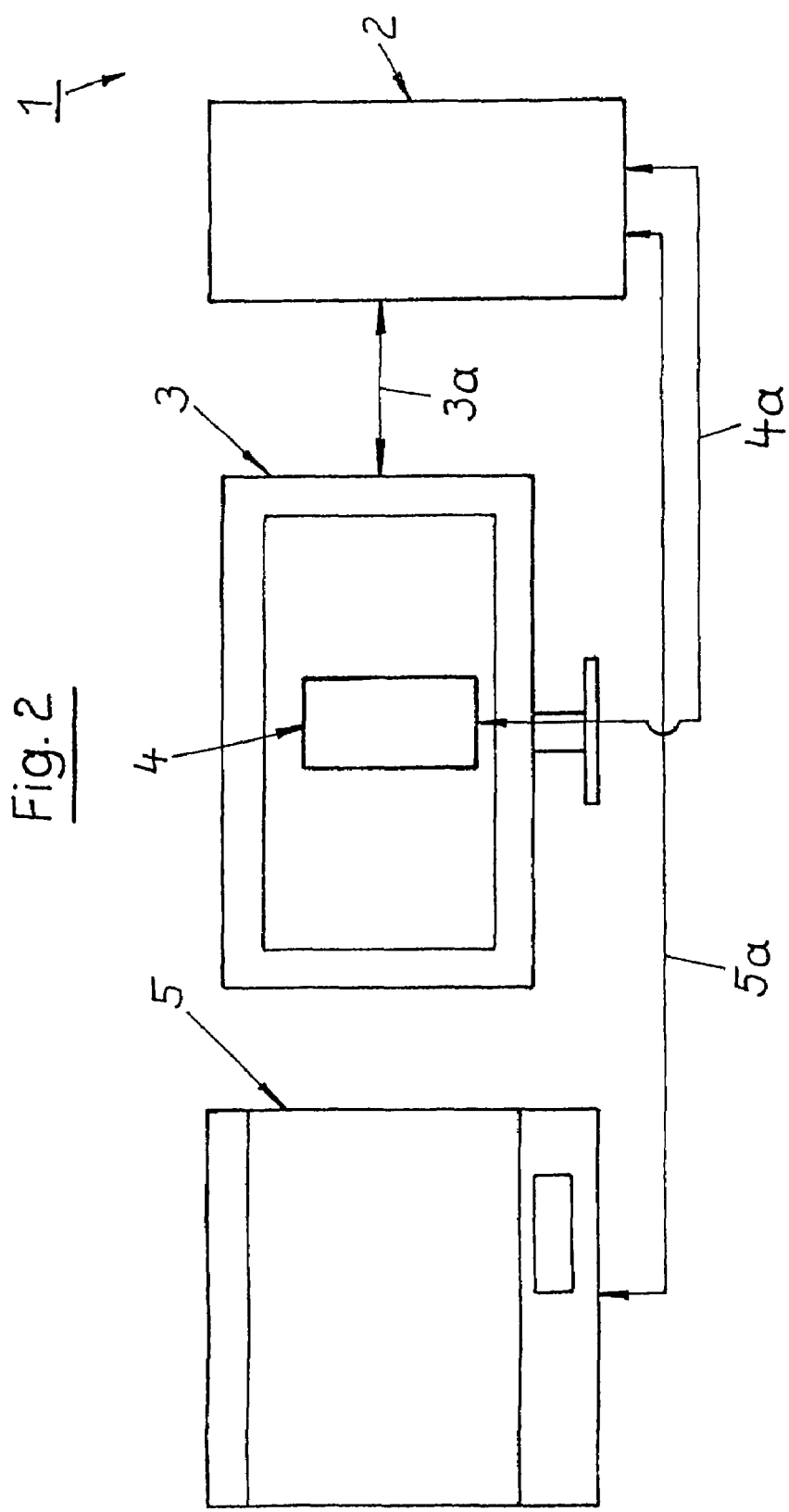
FIG. 2 the arrangement of a device unit of the device system for a method segment, and
FIG. 3 the arrangement of the same device unit of the device system for another method segment of the new method.

FIG. 2 documents the first method segment. The color and light measurement device 4 is positioned on the image surface of the monitor 3. The calibration routine for the monitor is started by means of an evaluation program stored in the memory of the evaluation unit 2. Using the color and light measurement device 4, the luminance of this monitor 3 is measured, and the result is passed on to the evaluation unit 2 as a signal. In the evaluation program, a reference value is stored for the monitor calibration. If there is a difference between the measured value and the reference value, the transmission of a control signal to the monitor 3 takes place by way of the signal line 3a, whereby this control signal influences the luminance of the monitor. The process of measuring the actual value of the luminance by means of the color-light measurement device 4, transmitting a corresponding signal to the evaluation unit 2, comparing it with the stored reference value for the monitor 3 in question, and giving off a control signal to the monitor, takes place until balancing (difference=0) between actual value and reference value has been achieved for calibration or profiling of the monitor 3.

Figure 3:
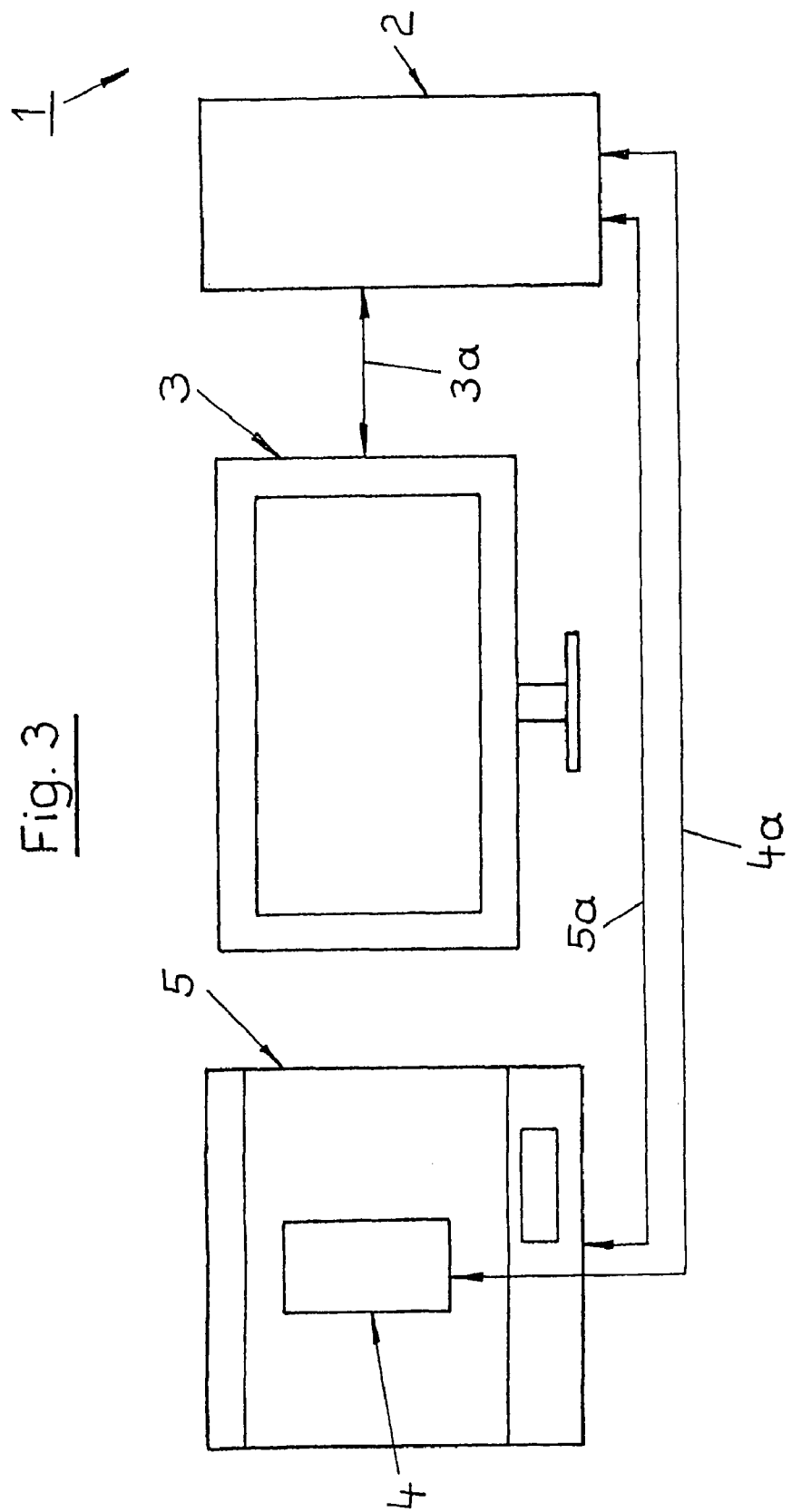

Afterwards, according to the representation in FIG. 3, the color and light measurement device 4 is removed from the monitor 3 and positioned on the working surface of the standard light device 5. The currently present value of the luminance at the standard light device 5 is measured and reported to the evaluation unit 2 by way of the signal line 4a. The calibrated value for the luminance of the monitor, as a reference value, is compared with the actual value of the luminance measurement at the standard light device 5, using the evaluation program also used for the calibration of the monitor 3. If there is a difference between these two values, a control signal is sent to the standard light device 5, by way of the signal line 5a, on the basis of which signal a change in the brightness and/or the contrast of the standard light device 5 is carried out. The luminance that has now been achieved is again measured, using the color and light measurement device 4, and a corresponding signal is sent to the evaluation unit 2. The regulation routine is continued until the luminance measured at the standard light device agrees with the reference value, the luminance of the monitor 3.

REFERENCE SYMBOL LIST 1 device system
2 evaluation unit (personal computer)
3 monitor
3a signal line for connecting item 3 with item 2
4 color and light measurement device
4a signal line for connecting item 4 with item 2
5 standard light device with computer interface
5a signal line for connecting item 5 with item 2

What is claimed is:

1. Method for calibration, controlled by measurement technology, of at least one device unit of a device system (1), which comprises at least a monitor (3) for image processing and a standard light device (5), comprising the method steps:
 a) first, the monitor is calibrated using a color and light measurement device (4) as well as an evaluation program stored in the memory of an evaluation unit (2);
 b) the luminance is measured, in $cd/m^2$, at the calibrated monitor (3), and this actual value is stored in the memory of the evaluation unit (2) as a reference value for the calibration of the standard light device (5);
 c) using said color and light measurement device (4), the luminance is then measured at the standard light device (5), and the actual value is also passed to the evaluation unit (2), by way of a signal line (4a);
 d) in the evaluation unit (2), the actual value of the luminance at the standard light device (5) is compared with the value for the luminance of the monitor (3) stored in the memory of the evaluation unit (2) as a reference value for the standard light device (5);

e) if there is a difference between the actual value of the measurement at the standard light device (5) passed to the evaluation unit (2) and the stored reference value, the standard light device (5) receives a control signal from the evaluation device (2), to change the brightness or the contrast;

f) this regulation is continued until no difference exists any longer between the measured actual value at the standard light device (5) and the reference value stored in the memory of the evaluation unit (2).

2. Method for calibration according to claim 1, wherein the values for color and for the maximal brightness of the white point of the monitor, gradation curves independent of the ambient brightness, as well as values with regard to color perception changes of the observer are taken into consideration in the calibration.

3. Method for calibration according to claim 1, wherein the values for color and for the maximal brightness of the white point of the monitor, gradation curves independent of the ambient brightness, as well as values of the change in surface reflection of the reproduction device are taken into consideration in the calibration.

\* \* \* \* \*